United States Patent
Okude et al.

(10) Patent No.: US 7,411,567 B2
(45) Date of Patent: Aug. 12, 2008

(54) DISPLAY APPARATUS

(75) Inventors: Naohito Okude, Kanagawa (JP);
Takashi Matsumoto, Kanagawa (JP);
Taketoshi Kamada, Kanagawa (JP);
Yutaka Kamoshita, Kanagawa (JP);
Marie Goto, Kanagawa (JP)

(73) Assignee: Keio University, Tokyo (JP)

( * ) Notice: Subject to any disclaimer, the term of this patent is extended or adjusted under 35 U.S.C. 154(b) by 674 days.

(21) Appl. No.: 10/862,313

(22) Filed: Jun. 8, 2004

(65) Prior Publication Data
US 2005/0017921 A1    Jan. 27, 2005

(30) Foreign Application Priority Data
Jun. 9, 2003  (JP) ............... P.2003-164080

(51) Int. Cl.
    *G09G 5/00*  (2006.01)
(52) U.S. Cl. ...................................... 345/1.3
(58) Field of Classification Search ........... 345/1.1–3.4, 345/204
See application file for complete search history.

(56) References Cited
U.S. PATENT DOCUMENTS

| | | | |
|---|---|---|---|
| 2003/0076277 A1 * | 4/2003 | Muramatsu et al. | 345/1.1 |
| 2003/0222833 A1 * | 12/2003 | Nakai | 345/1.1 |
| 2004/0036213 A1 * | 2/2004 | Lindsey | 273/146 |
| 2004/0164974 A1 * | 8/2004 | Son et al. | 345/204 |

FOREIGN PATENT DOCUMENTS

| | | | |
|---|---|---|---|
| JP | 62-25783 | | 2/1987 |
| JP | 06289952 A | * | 10/1994 |
| JP | 8-241069 | | 9/1996 |
| JP | 2000293120 A | * | 10/2000 |
| JP | 2001242845 A | * | 9/2001 |
| WO | WO 9826585 A1 | * | 6/1998 |

OTHER PUBLICATIONS

"Smart-Media Applications Created by Scenario Based Modeling" Proceedings of IEEE 2004 Symposium on Applications and the Internet—Workshops (Saint 2004 Workshops) International Workshops on Cyberspace Technolgies and Societies (IWCTS2004), pp. 473-479, Jan. 2004, and.
"Cubic Display Device "Z-agon"" User Interaction Coordinated by the Turning Interface.

* cited by examiner

*Primary Examiner*—Amr Awad
*Assistant Examiner*—Stephen G Sherman
(74) *Attorney, Agent, or Firm*—Sughrue Mion, PLLC

(57) ABSTRACT

A first LCD 11~a sixth LCD 16 are disposed on each surface of a display apparatus which becomes a cubic shape in its entirety. With image data to be displayed on the LCDs 11~16, correlated is a position of a surface to be displayed, of the cubic, and in accordance with the correlated surface position, it is transferred to at least one of the display data output sections 2a~2f. A control section 1 outputs a control signal 100 which controls a correlation of image data and the LCDs 11~16 which display an image based upon the image data, by utilizing information which shows this surface position and a up/down direction from a up/down detection section 5. A changeover switch 3 connects, in accordance with the control signal 100, the display data output sections 2a~2f and drive circuits 21~26 which drive the LCDs 11~16 at corresponding positions.

7 Claims, 8 Drawing Sheets

FIRST LCD

SECOND LCD

THIRD LCD

FOURTH LCD

FIFTH LCD

SIXTH LCD

STANDARD

LEFT 90°

RIGHT 90°

INVERTED

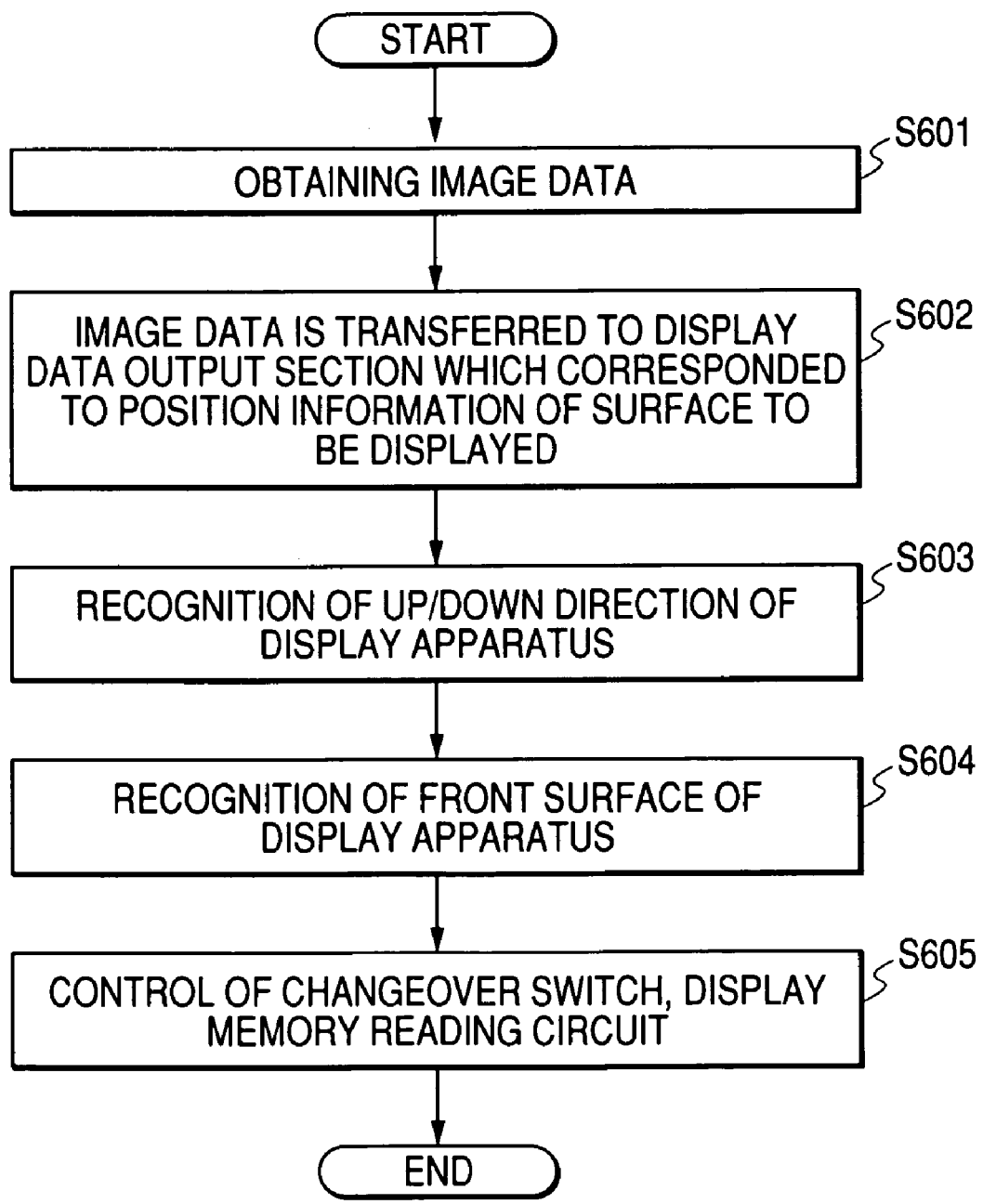

FIG. 8

| NUMBER OF DISPLAY SECTION | LCD NUMBER AT EACH SURFACE POSITION | | | | | | READING DIRECTION OF DISPLAY MEMORY READING CIRCUIT OF DISPLAY DATA OUTPUT SECTION | | | | | |
|---|---|---|---|---|---|---|---|---|---|---|---|---|
| | TOP SURFACE | BOTTOM SURFACE | FRONT SURFACE | BACK SURFACE | RIGHT SIDE SURFACE | LEFT SIDE SURFACE | 2a | 2b | 2c | 2d | 2e | 2f |
| 1 | 16 | 13 | 11 | 14 | 12 | 15 | STANDARD | STANDARD | STANDARD | STANDARD | STANDARD | STANDARD |
| 2 | 16 | 13 | 12 | 15 | 14 | 11 | STANDARD | STANDARD | STANDARD | STANDARD | LEFT 90° | RIGHT 90° |
| 3 | 16 | 13 | 14 | 11 | 15 | 12 | STANDARD | STANDARD | STANDARD | STANDARD | INVERTED | INVERTED |
| 4 | 16 | 13 | 15 | 12 | 11 | 14 | STANDARD | STANDARD | STANDARD | STANDARD | RIGHT 90° | LEFT 90° |
| 5 | 13 | 16 | 11 | 14 | 15 | 12 | INVERTED | INVERTED | INVERTED | INVERTED | INVERTED | INVERTED |
| 6 | 13 | 16 | 12 | 15 | 11 | 14 | INVERTED | INVERTED | INVERTED | INVERTED | RIGHT 90° | LEFT 90° |
| 7 | 13 | 16 | 14 | 11 | 12 | 15 | INVERTED | INVERTED | INVERTED | INVERTED | STANDARD | STANDARD |
| 8 | 13 | 16 | 15 | 12 | 14 | 11 | INVERTED | INVERTED | INVERTED | INVERTED | LEFT 90° | RIGHT 90° |
| 9 | 14 | 11 | 12 | 15 | 13 | 16 | RIGHT 90° | LEFT 90° | RIGHT 90° | LEFT 90° | STANDARD | INVERTED |
| 10 | 14 | 11 | 13 | 16 | 15 | 12 | INVERTED | STANDARD | RIGHT 90° | LEFT 90° | STANDARD | INVERTED |
| 11 | 14 | 11 | 15 | 12 | 16 | 13 | LEFT 90° | RIGHT 90° | RIGHT 90° | LEFT 90° | STANDARD | INVERTED |
| 12 | 14 | 11 | 16 | 13 | 12 | 15 | STANDARD | INVERTED | RIGHT 90° | LEFT 90° | STANDARD | INVERTED |
| 13 | 11 | 14 | 12 | 15 | 16 | 13 | LEFT 90° | RIGHT 90° | LEFT 90° | RIGHT 90° | INVERTED | STANDARD |
| 14 | 11 | 14 | 13 | 16 | 12 | 15 | STANDARD | INVERTED | LEFT 90° | RIGHT 90° | INVERTED | STANDARD |
| 15 | 11 | 14 | 15 | 12 | 13 | 16 | RIGHT 90° | LEFT 90° | LEFT 90° | RIGHT 90° | INVERTED | STANDARD |
| 16 | 11 | 14 | 16 | 13 | 15 | 12 | INVERTED | STANDARD | LEFT 90° | RIGHT 90° | INVERTED | STANDARD |
| 17 | 15 | 12 | 11 | 14 | 16 | 13 | LEFT 90° | RIGHT 90° | STANDARD | INVERTED | LEFT 90° | LEFT 90° |
| 18 | 15 | 12 | 13 | 16 | 14 | 11 | LEFT 90° | RIGHT 90° | INVERTED | RIGHT 90° | LEFT 90° | LEFT 90° |
| 19 | 15 | 12 | 14 | 11 | 13 | 16 | LEFT 90° | RIGHT 90° | RIGHT 90° | STANDARD | LEFT 90° | LEFT 90° |
| 20 | 15 | 12 | 16 | 13 | 11 | 14 | RIGHT 90° | LEFT 90° | INVERTED | RIGHT 90° | RIGHT 90° | RIGHT 90° |
| 21 | 12 | 15 | 11 | 14 | 13 | 16 | RIGHT 90° | LEFT 90° | RIGHT 90° | STANDARD | RIGHT 90° | RIGHT 90° |
| 22 | 12 | 15 | 13 | 16 | 11 | 14 | RIGHT 90° | LEFT 90° | INVERTED | STANDARD | RIGHT 90° | RIGHT 90° |
| 23 | 12 | 15 | 14 | 11 | 16 | 13 | RIGHT 90° | LEFT 90° | LEFT 90° | INVERTED | RIGHT 90° | RIGHT 90° |
| 24 | 12 | 15 | 16 | 13 | 14 | 11 | RIGHT 90° | LEFT 90° | STANDARD | INVERTED | RIGHT 90° | RIGHT 90° |

DISPLAY APPARATUS

BACKGROUND OF THE INVENTION

This invention relates to a display device having a shape of a cubic in its entirety, by which it is possible to display a plurality of images.

In these years, development of flat surface type display devices (flat displays) such as liquid crystals, plasma-visions, electronic papers, is moved forward, and it has become possible to display crisp images on a thin surface. As a display apparatus in which 6 pieces of the such like flat surface type display devices are combined in a shape of a cubic, there are things which are described in a patent document 1, and a patent document 2.

A display apparatus which is described in the patent document 1 makes it possible to display three-dimensional image data in such a form that there are an appearance of solidity, and a feeling of being at a live performance, by supplying a horizontal synchronization signal, a vertical synchronization signal and a video signal to respective flat displays which are combined in the shape of the cubic, and by having different images displayed simultaneously.

Further, a display apparatus which is described in the patent document 2 makes it possible to arbitrarily change a relation of each image signal to be inputted and a display device, by disposing a matrix switch between each display device and an input terminal. And, if it is configured to control this matrix switch by a programmable processing device such as a personal computer, it becomes possible to rotate, replace and so on, an image in an arbitrary direction, and for example, it becomes possible to realize a varied display even in case of displaying a still image.

Patent Document 1
    JP-A-62-25783 publication

Patent Document 2
    JP-A-8-241069 publication

However, each of the display apparatuses which are described in the above-described patent documents carries out a display on the assumption that a setting direction (up/down relation) of the display apparatus does not change. On that account, there is such a problem that it becomes difficult to take a look at a content of a display, in case that the up/down relation of the display device changed (a bottom surface of the cubic changed), and so on.

SUMMARY OF THE INVENTION

This invention is made in view of the above-described circumstance, and aims to provide a display apparatus in which there is no change of a display direction, even if a up/down relation of display apparatuses which are combined in a shape of a cubic.

According to a first aspect of this invention, a display apparatus has a shape of a cube in its entirety, and by which it is possible to display a plurality of images, including 6 pieces of flat surface type display devices which are disposed on each surface of the cube, a up/down detection section which detects a up/down direction of the cubic, and a display control section realizes a display of an image based upon image data on one of or a plurality of the flat surface type display devices, wherein a display position information, which shows a position of a surface on which the cubic is displayed, is correlated with the image data, and the display control section correlates the image data and the flat surface type display device which displays an image based upon the image data, at least by utilizing up/down direction information from the up/down detection section and the display position information.

According to a second aspect of this invention, a display apparatus further includes an operation section for inputting specific surface setting information by which carried out is such an initial setting that any one of the flat surface type display devices, which are located on a surface other than a bottom surface and a top surface of the cubic, is located on an any surface of a front surface, a back surface, a right side surface and a left side surface, wherein the display control section correlates the image data and the flat surface type display device which displays an image based upon the image data, by utilizing the specific surface setting information.

According to a third aspect of this invention, in a display apparatus, the display control section determines a display direction of an image on the flat surface type display device, in accordance with a correlation of the image data and the flat surface type display device which displays an image based upon the image data.

According to a forth aspect of this invention, a display apparatus further includes an image data storage section which stores image data, wherein the display control section realizes a display of an image based upon image data which is stored in the image data storage section.

According to a fifth aspect of this invention, a display apparatus further includes an input section for inputting at least image data, wherein the display control section realizes a display of an image based upon image data which is inputted from the input section.

According to a sixth aspect of this invention, in a display apparatus, the input section includes a wireless communication section.

According to a seventh aspect of this invention, in a display apparatus, a setting of a fixed display mode is possible, and the display control section fixes a correlation of the image data and the flat surface type display device which displays an image based upon the image data, to a correlation in an initial state, regardless of change of the cubic in the up/down direction, at the time of the fixed display mode.

BRIEF DESCRIPTOIN OF THE DRAWINGS

FIG. 6 is a view which shows a schematic operation flow of display control by a control section.

FIG. 8 is a view which shows the reading direction of the display memory reading circuit in accordance with a state of a display section.

DETAILED DESCRIPTION OF THE PREFERRED EMBODIMENTS

Figure 1:
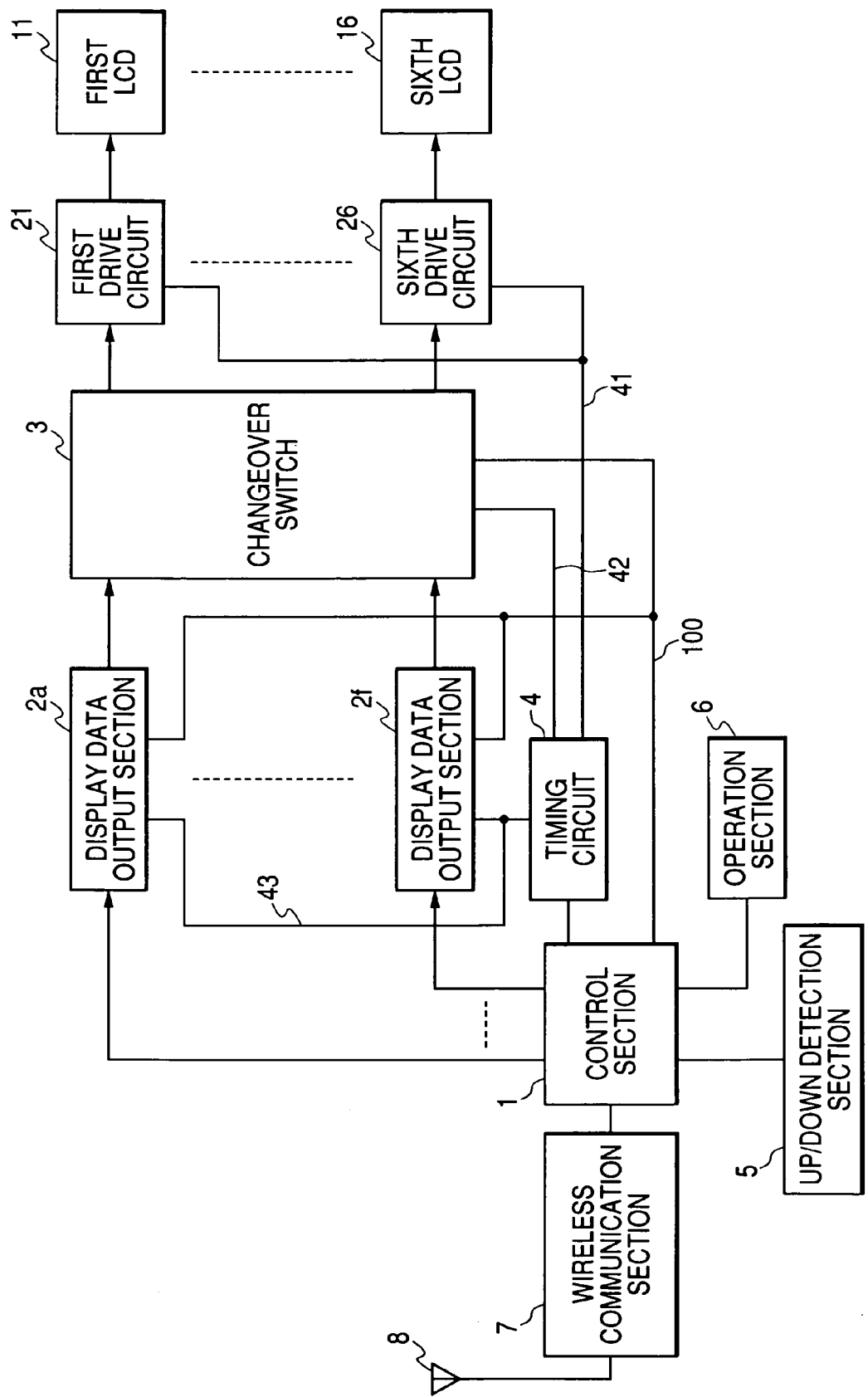
FIG. 1 is a view which shows a schematic configuration of a mode for carrying out a display apparatus of this invention.

Hereinafter, modes for carrying out this invention will be described by use of drawings. FIG. 1 is a view which shows a schematic configuration of a mode for carrying out a display apparatus of this invention. The display apparatus of FIG. 1 is configured including first~sixth liquid crystal display panels (hereinafter, described as "LCD") 11~16, first~sixth drive circuits 21~26, a control section 1, 6 pieces of display data output sections 2a~2f, a changeover switch 3, a timing circuit 4, a up/down detection section 5, an operation section 6, a wireless communication section 7, and an antenna 8. In addition, in FIG. 1, omitted are descriptions of the second LCD 12~the fifth LCD 15, the second drive circuit 22~the fifth drive circuit 25, and the display data output sections 2b~2e.

The first LCD 11~the sixth LCD 16, which are a kind of flat surface type display devices, are display panels with the same sizes in a shape of a square, and are disposed on each surface of the display apparatus in such a manner that they become a shape of a cubic in their entirety. The LCDs 11~16 may be fixed by stoppers at 6 peaks of the cubic as in the display apparatus of the patent document 1, and may be fixed to a cubic shaped frame as in the display apparatus of the patent document 1. Sizes of the LCDs 11~16 may be the same as a size of the cubic, and may be a little bit smaller. In case that it is small, they are disposed concentrically to each surface of the cubic.

Figure 2:
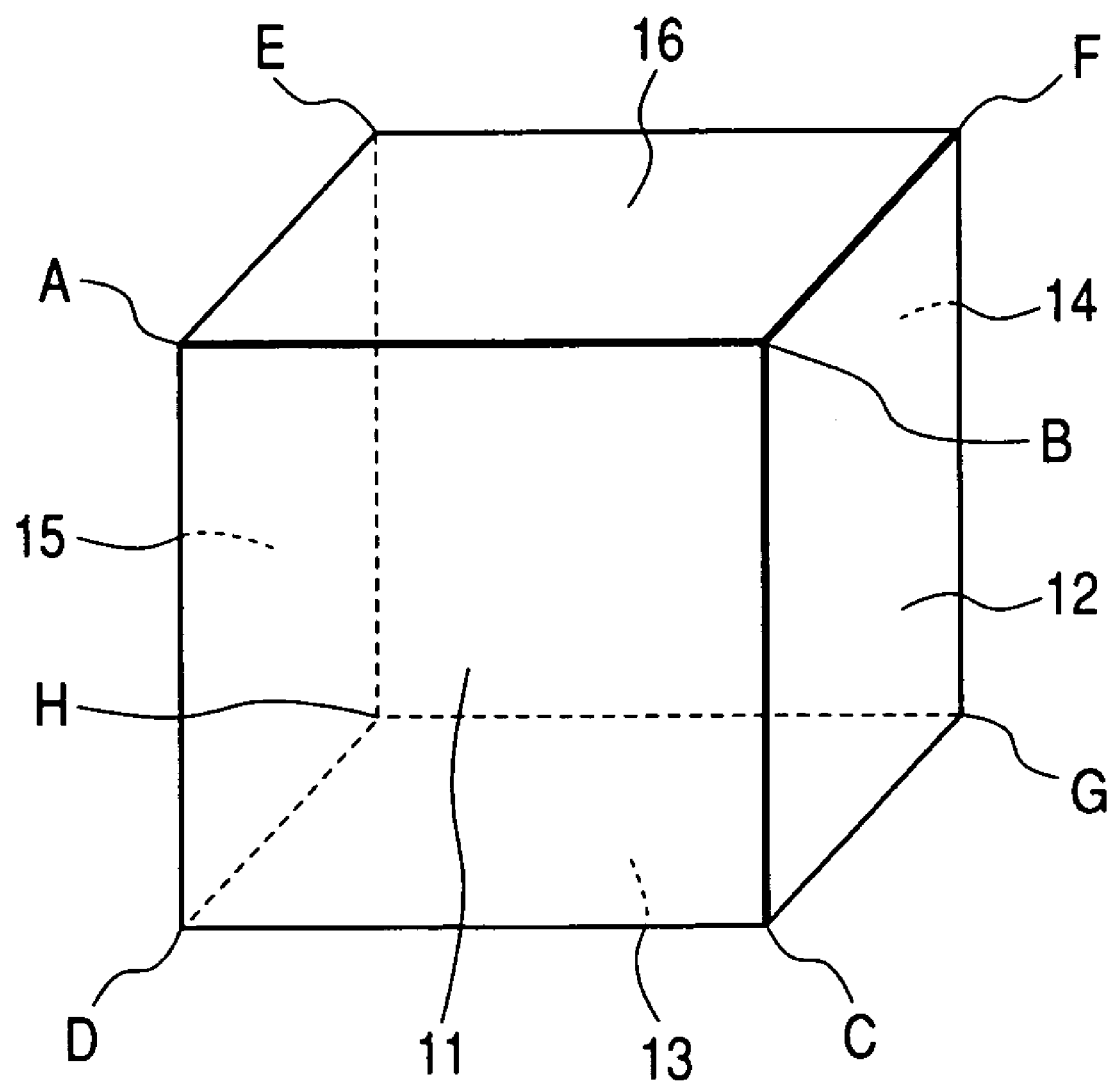
FIG. 2 is a view which shows one example of allocation of LCDs in the mode for carrying out this invention.

In FIG. 2, shown is one example of an allocation of the first LCD 11~the sixth LCD 16. FIG. 2 is a thing which schematically showed positions of the first LCD 11~the sixth LCD 16 in the cubic, and the third LCD 13 is disposed on a bottom surface of the cubic, and the sixth LCD 16 is disposed on a top surface. Other LCDs 11, 12, 14, 15 are disposed on side surfaces, but in case of describing in such a manner that an allocation surface of one LCD is a front surface, other allocation surfaces are described as a right side surface, a left side surface, a back surface. For example, assuming that an allocation surface of the first LCD 11 is a front surface, an allocation surface of the second LCD 12 becomes a right side surface, and an allocation surface of the fifth LCD 15 becomes a left side surface, and an allocation surface of the fourth LCD 14 becomes a back surface.

Figure 3A:
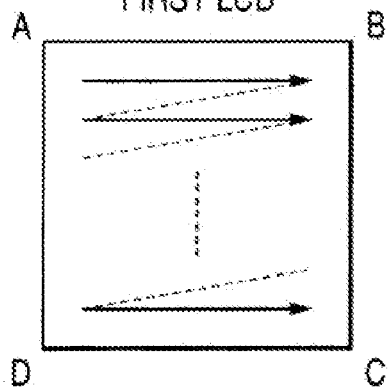
FIGS. 3A to 3F are views which show one example of a driving order of each pixel of LCD in the mode for carrying out this invention.
Figure 3B:
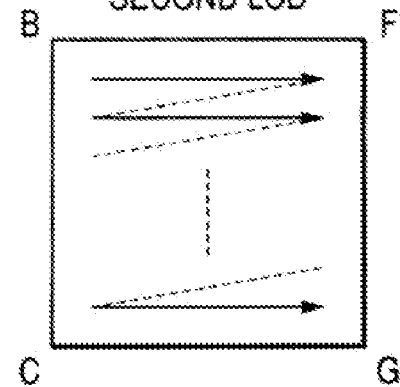
Figure 3C:
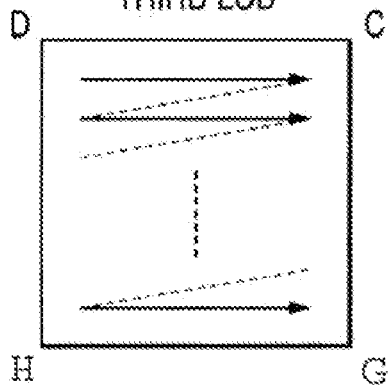
Figure 3D:
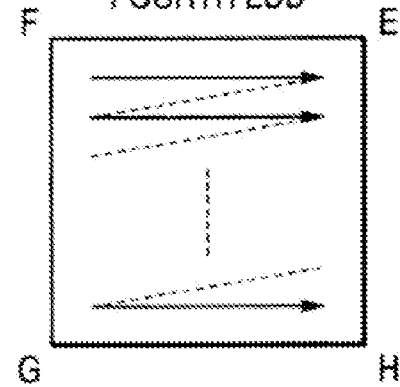
Figure 3E:
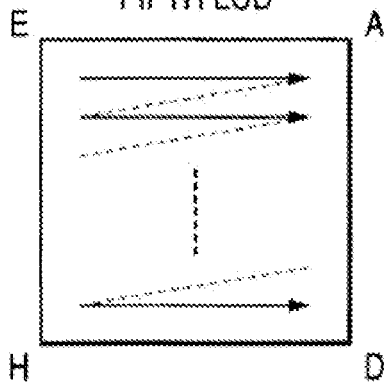
Figure 3F:
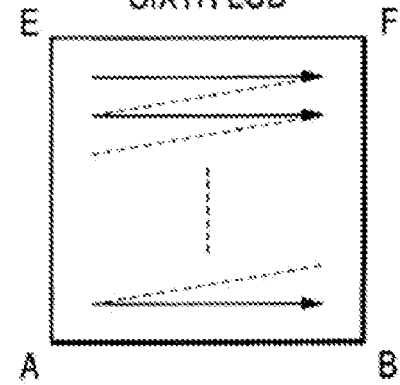

The first drive circuit 21~the sixth drive circuit 26 are things which drive the first LCD 11~the sixth LCD 16, respectively, and operate in synchronization with a timing signal 41 from the timing circuit 4. Drive control circuits 21~26 drive each pixel of each LCD 11~16 in a predetermined order, on the basis of image data which is inputted sequentially. For example, the fist drive control circuit 21 drives the first LCD 11 in the order shown in FIG. 3A. As shown by an arrow in FIG. 3A, the first LCD is driven from a pixel which is the nearest to a peak A of the cubic toward a peak B direction, and sequentially, driven toward a peak D and a peak C sides. In the same manner, the drive control circuits 22~26 drives the LCDs 12~16 in the order shown in FIGS. 3B~3F. Since the suchlike driving method is known publicly, detailed descriptions of the drive circuits 21~26 will be omitted. In addition, timing signals which are supplied to the first drive circuit 21~the sixth drive circuit 26 may be synchronous, and may be asynchronous, but in case of displaying a moving image of the same object, and so on, it is preferable to make them synchronous signals.

The display data output sections 2a~2f include display memories which store image data to be displayed on the LCDs 11~16 and display memory reading circuits (both are not shown in the figure), and output each pixel signal which is stored respectively in the display memory, sequentially. An output timing is controlled by a timing signal 43 from the timing circuit 4. Assuming that the number of display pixels of the LCDs 11~16 is (n×n) pieces, each image memory of the display data output sections 2a~2f stores image data which corresponds to pixels of at least (n×n) pieces. In case of storing the image data which corresponds to the pixels of (n×n) pieces. Image data which corresponds to tetragonal lattice positions of (n×n) is stored in corresponding address positions as shown in FIG. 4, and read out by the display memory reading circuit in a predetermined order.

Figure 5A:
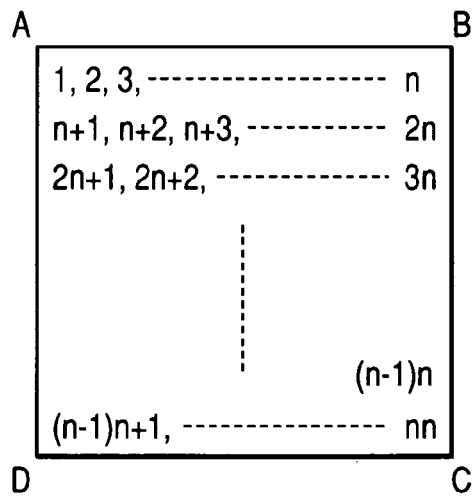
FIGS. 5A to 5D are views which explain a relation of the reading direction of the display memory reading circuit and a display position of LCD.

The display memory reading circuit is capable of reading in 4 directions, and a reading direction is selected by a control signal 100 from the control section 1. A first reading direction is reading in a direction of an arrow <1>, and image signals of addresses 1, 2, ..., n, (n+1), ..., (nn) are read out sequentially. This reading direction is called as "standard direction". Now, when image data, which is read out in the standard direction, is supplied to the first drive circuit 21 to drive the first LCD 11, images, which are based upon image data of each address, are displayed at pixels positions as shown in FIG. 5A, on the first LCD 11.

Figure 4:
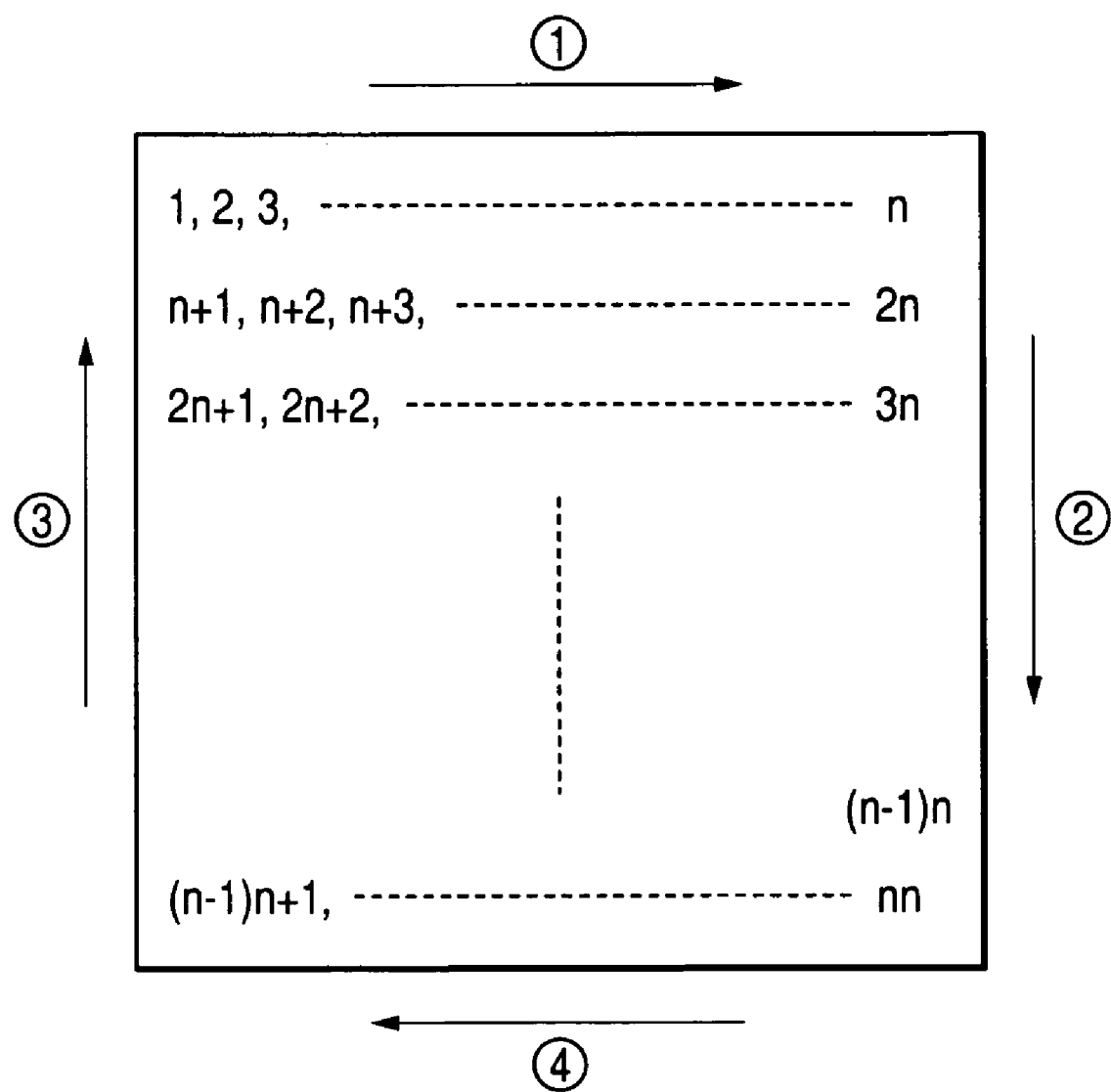
FIG. 4 is a view which explains a reading direction of a display memory reading circuit.
Figure 5B:
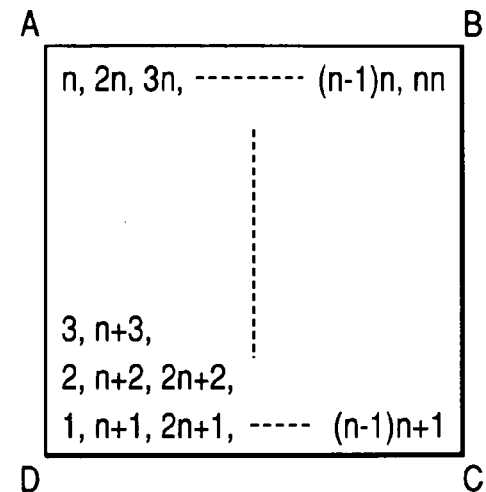
Figure 5C:
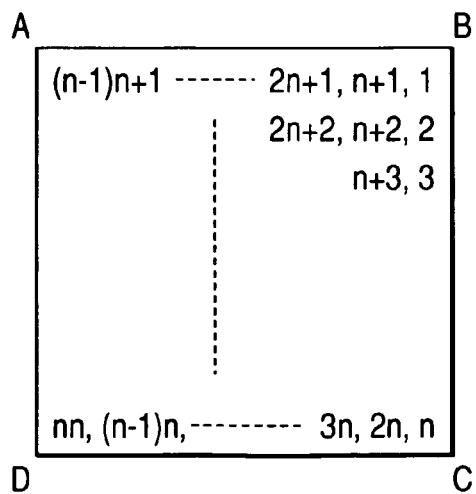
Figure 5D:
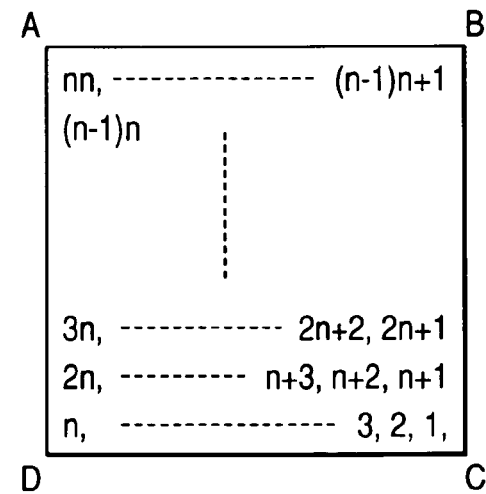

A second reading direction is one for displaying images which are based upon image data of each address at pixel positions as shown in FIG. 5B (when it is read out in this direction, images to be displayed become such ones that images in the standard direction are inclined to left by 90°, and therefore, it is called as "left 90° direction"), and is to read out in a <2> direction of FIG. 4. A third reading direction is one for displaying images which are based upon image data of each address at pixel positions as shown in FIG. 5C (when it is read out in this direction, images to be displayed become such ones that images in the standard direction are inclined to right by 90°, and therefore, it is called as "right 90° direction"), and is to read out in a <3> direction of FIG. 4. Further, a fourth direction is one for displaying images which are based upon image data of each address at pixel positions as shown in FIG. 5D (when it is read out in this direction, images to be displayed become such ones that images in the standard direction are inverted, and therefore, it is called as "inverted direction"), and is to read out in a <4> direction of FIG. 4.

The changeover switch 3 is a thing which changes over to which one of the drive circuits 21~26, output image data of the display data output sections 2a~2f are transferred, and a changeover state is selected by the control signal 100 from the control circuit 1. Now, assuming that the display data output section 2a outputs display image data of a front surface of the cubic, and the display data output sections 2b, 2c, 2d, 2e, 2f output display image data of a back surface, a right side surface, a left side surface, a top surface, a bottom surface of the cubic, respectively, and the display apparatus is located as shown in FIG. 2 (concretely speaking, the first LCD 11 has become a front surface, and the third LCD is disposed on a bottom surface), each of reading circuits of the display data output sections 2a~2f carries out reading in the standard direction.

In addition, a top surface and a bottom surface of the cubic are judged by an output of the up/down detection section 5 which will be described later. Further, as to such a matter that a front surface is set to be a surface on which there exists which LCD, any one of 4 surfaces other than a top surface and a bottom surface is determined as a predetermined standard (e.g., the youngest numbered LCD), and a user may set by operating the operation section 6.

The timing circuit 4 supplies timing signals for use in driving, to the drive control circuits 21~26, the display data output sections 2a~2f, and supplies a changeover timing signal to the changeover switch.

The up/down detection section 5 is a thing which detects a up/down direction of the display apparatus in which the LCDs 11~16 are disposed in each surface of the cubic, and for example, is a thing which identifies a sensor which points out a vertical direction and a LCD which is disposed in a direction of the sensor, and which judges any one of a top surface and a bottom surface of the cubic.

The operation section 6 is a thing by which a user carries out various operations, and for example, is a touch panel which is disposed on one of, or a plurality of the LCDs 11~16. In case that touch panels are disposed on all of the LCDs 11~16, the above-described determination of a front surface of the display apparatus can be carried out by touching a predetermined position of a LCD which is desired to be used as a front surface.

The wireless communication section 7 is a thing for inputting various data including image data to be displayed on the LCDs 11~16, through the antenna 8. As wireless communication, various methods such as wireless LAN can be adopted. IN addition, inputting various data to the display apparatus may be carried out by wired communication such as a LAN cable, without restricting to the wireless communication.

The control section 1 carries out control of the entire display apparatus, and is configured by a processor which operates on the basis of a predetermined program, as a main body. In the control which is carried out by the control section 1, included is control for having an image based on at least one of image data which is inputted through the wireless communication section and image data which is stored in advance in an internal memory (not shown in the figure) in the control section, displayed on at least one of the LCDs 11~16. In case of displaying an image based on a plurality of image data, the image data which is inputted through the wireless communication section 7 and the image data which is stored in the internal memory (not shown in the figure) may be combined to be utilized. Further, a moving image and a still image may be combined.

With the image data to be displayed, correlated is a surface position of the cubic, to be displayed. The control section 1 outputs the control signal 100 which controls correlating image data and the LCDs 11~16 which display an image based upon the image data, by utilizing this surface position and information which shows a up/down direction of the display apparatus from the up/down detection section 5. For the correlation of the image data and the LCDs 11~16, front surface information of the display apparatus may be also utilized additionally.

The surface position information to be correlated with image data is, for example, information which specifies at least one surface of a front surface, a back surface, a right side surface, a left side surface, a top surface, and a bottom surface of the cubic. On the occasion of correlating a surface position to be displayed, of the cubic, with image data to be displayed, surface position information, which is included in the image data itself, may be utilized, and it may be properly selected by the control section 1. Further, a plurality of surface position information may be correlated with one image data. In that case, the same image is to be displayed on LCDs located on a plurality of surfaces.

In addition, the control section 1, the display data output sections 2a~2f, the changeover switch 3, the timing circuit 4, the up/down detection section 5, the wireless communication section 7, and the drive control circuits 21~26 of FIG. 1 are disposed at proper places inside the display apparatus which is of a cubic shape in its entirety. Further, it is preferable to dispose the antenna, inside the display apparatus or at an edge part of the cubic.

In FIG. 6, shown is a schematic operation flow of display control by the control section 1. In case of displaying images on the LCDs 11~16, in a step S601, obtained is image data to be displayed. Obtaining the image data is carried out trough the wireless communication section 7 or by reading out it from an internal memory. One or a plurality of image data which is obtained is transferred to the corresponding display data output sections 2a~2f on the basis of respective correlated surface position information (step S602). In this example, image data to be displayed on a front surface position of the cubic is transferred to the display data output section 2a, and image data to be displayed on a back surface position is transferred to the display data output section 2b, and image data to be displayed on a right side surface position is transferred to the display data output section 2c, and image data to be displayed on a left side surface position is transferred to the display data output section 2d, and image data to be displayed on a top surface position is transferred to the display data output section 2e, and image data to be displayed on a bottom surface position is transferred to the display data output section 2f.

In a step S603, a up/down direction of the display apparatus is recognized on the basis of a detection signal from the up/down detection section 5. Concretely speaking, numbers of LCDs which are located on a bottom surface and a top surface of the display apparatus are specified. And, in a step S604, a front surface of the display apparatus is recognized. Concretely speaking, number of a LCD which is located on a front surface of the display apparatus is specified. It is possible to specify the front surface of the display apparatus by transition of number of a LCD which is located on a front surface in an initial state and numbers of LCDs which are located on a bottom surface and a top surface.

A method of specifying a front surface of the display apparatus will be described by use of FIG. 7. It is assumed that the LCDs 11~16 of the display apparatus are in a state of FIG. 7A (same as the state of FIG. 2), and a surface on which the LCD 11 exists is set as a front surface. In case of having changed from this state to a state of FIG. 7B, by recognition of a up/down direction, it is found that LCD number on a bottom surface is changed from 13 to 12. Even if the LCD number on a bottom surface is changed from 13 to 12, LCD number on a front surface is remained as 11, since the LCD 11 on an original front surface is not moved toward a top surface and toward a bottom surface.

Figure 7A:
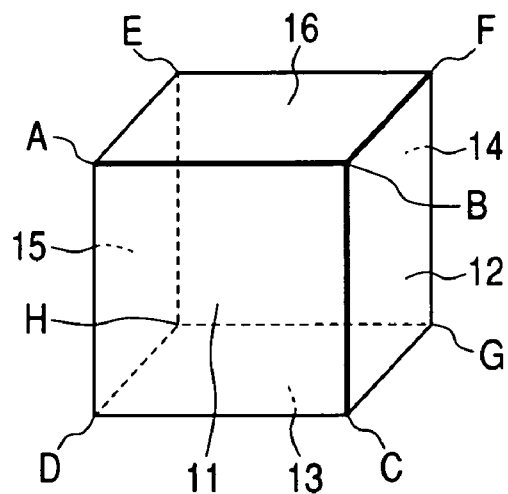
FIGS. 7A to 7C are views which explain a method of specifying a front surface of the display apparatus.
Figure 7B:
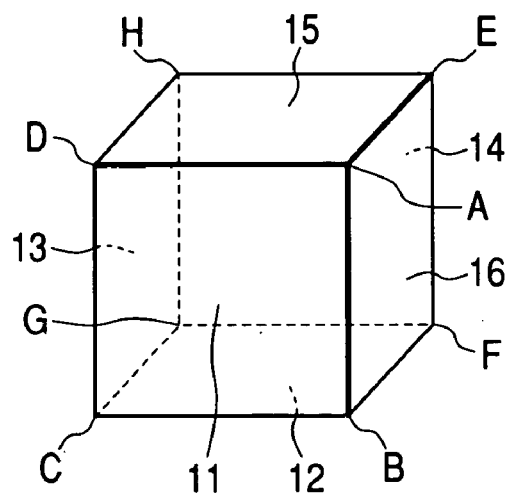
Figure 7C:
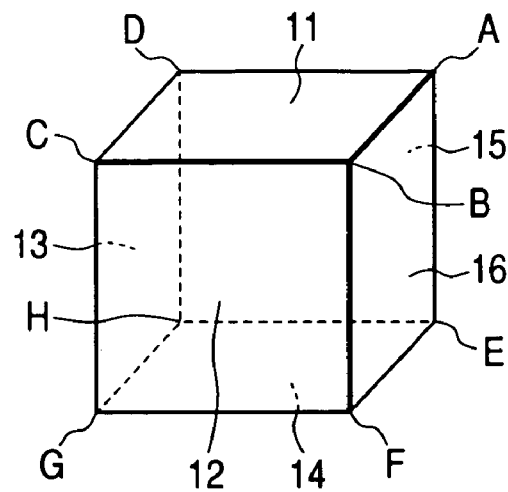

When a state is changed from the state of FIG. 7B to a state of FIG. 7C, it is found that LCD number on a bottom surface is changed from 12 to 14. And, in case that LCD number on a bottom surface is 14, it is found that the LCD on an original front surface is moved to a top surface. In this case, the LCD on an original bottom surface is set to be a LCD on a front surface. In the same manner, in case that a LCD on an original front surface is moved to a bottom surface, a LCD on an original top surface is set to be a LCD on a front surface.

By the judgment as above, it is possible to specify a LCD at a specific surface position (concretely speaking, a front surface, a back surface, a right side surface, a left side surface, a top surface, and a bottom surface) of the display apparatus, and therefore, in a step S605, by controlling the changeover switch 3, the display data output sections 2a ~2f are connected to the drive circuits 21~26 which drive the LCDs 11~16 at corresponding positions. Further, in accordance with positions of the LCDs 11~16, controlled is a reading direction of a display memory reading circuit. Control of the changeover switch 3 and control of the reading direction of the display memory reading circuit are carried out by the control signal 100.

In FIG. 8, shown is the reading direction of the display memory reading circuit in accordance with a state of the display section. In addition, state number of the display section in FIG. 8 can be specified by LCD numbers at adjacent 2 surface positions, and therefore, a state is recognized by LCD number on a bottom surface (or top surface) and LCD number on a front surface. And, in accordance with each surface position which is specified by state number, and LCD number, the changeover switch 3 connects the display data output sections 2a~2f and the drive circuits 21~26. Further, by state number of the display section, the display memory reading circuit selects a reading order of a display memory.

For example, in case that the display apparatus is in the state of FIG. 7B, the control section 1 can recognize that LCD number which is located on a front surface is 11 and LCD number which is located on a bottom surface is 12, and therefore, it judges that state number of the display section is 17, and outputs state number 17, as the control signal 100. The changeover switch 3, when state number 17 is inputted as the control signal 100, connects the display data output section 2a to the first drive circuit 21 for use in driving the first LCD 11, and connects the display data output section 2b to the fourth drive circuit 24 for use in driving the fourth LCD 14, and connects the display data output section 2c to the sixth drive circuit 26 for use in driving the sixth LCD 16, and connects the display data output section 2d to the third drive circuit 25 for use in driving the third LCD 13, and connects the display data output section 2e to the fifth drive circuit 25 for use in driving the fifth LCD 15, and connects the display data output section 2f to the second drive circuit 21 for use in driving the second LCD 12. Further, display memory reading circuits of the display data output sections 2a~2f read out image data of display memories, in a left 90° direction, in a right 90° direction, in a left 90° direction, in left 90° direction, in a left 90° direction, and in a left 90° direction, respectively.

By carrying out control as above, even if a position state of the display apparatus is changed, a user can observe a display image, without feeling a change substantially.

On one hand, in case of desiring to observe from a different direction, by having images (three-dimensional image etc.) from different directions displayed on a plurality of LCDs, as in a conventional display apparatus, it may be possible to set a fixed display mode by the operation section 6. In case of the fixed display mode, once connections of the display data output sections 2a~2f and the drive circuits 21~26, and a reading direction of image data, are determined, the control signal 100 is fixed, regardless of a change of a position state of the display apparatus.

As apparent from the above-described explanation, according to this invention, it is possible to provide a display apparatus in which there is no change of a display direction, even if a up/down relation of a display apparatus, which is combined in a cubic shape, is changed.

What is claimed is:

1. A display apparatus having a shape of a cube in entirety thereof, for displaying a plurality of images, comprising:
    6 pieces of flat surface type display devices which are disposed on each surface of the cube,
    a up/down detection section which detects a up/down direction of the cubic, and
    a display control section realizes a display of an image based on image data, the image data being correlated with a display position information showing a position of a surface on which the cube is displayed on one of or a plurality of the flat surface type display devices, wherein
    a specific flat surface type display device number each is specifically associated with each of said 6 pieces of flat surface type display devices,
    the display control section correlates the image data and the flat surface type display device which displays an image based upon the image data, at least by utilizing the flat surface type display device numbers associated with the top surface and the bottom surface of the cube based on up/down direction information from the up/down detection section, transition of the flat surface type display device numbers associated with the top surface and the bottom surface of the cube and the display position information so that a display direction does not change even if a up/down relation of the display apparatus changes.

2. The display apparatus as set forth in claim 1, further comprising:
    an operation section for inputting specific surface setting information by which carried out is such an initial setting that any one of the flat surface type display devices, which are located on a surface other than a bottom surface and a top surface of the cubic, is located on an any surface of a front surface, a back surface, a right side surface and a left side surface, wherein
    the display control section correlates the image data and the flat surface type display device which displays an image based upon the image data, by utilizing the specific surface setting information.

3. The display apparatus as set forth in claim 1, wherein
    the display control section determines a display direction of an image on the flat surface type display device, in accordance with a correlation of the image data and the flat surface type display device which displays an image based upon the image data.

4. The display apparatus as set forth in claim 1, further comprising:
    an image data storage section which stores image data, wherein
    the display control section realizes a display of an image based upon image data which is stored in the image data storage section.

5. The display apparatus as set forth in claim 1, further comprising:
    an input section for inputting at least image data, wherein
    the display control section realizes a display of an image based upon image data which is inputted from the input section.

6. The display apparatus as set forth in claim 5, wherein
    the input section includes a wireless communication section.

7. The display apparatus as set forth in claim 1, wherein
    a setting of a fixed display mode is possible, and
    the display control section fixes a correlation of the image data and the flat surface type display device which displays an image based upon the image data, to a correlation in an initial state, regardless of change of the cubic in the up/down direction, at the time of the fixed display mode.

* * * * *